United States Patent [19]

Liu

[11] Patent Number: 4,677,286

[45] Date of Patent: Jun. 30, 1987

[54] METHOD AND APPARATUS FOR AUTOFOCUSING A MICROSCOPE

[75] Inventor: Kuo-Ching Liu, Setauket, N.Y.

[73] Assignee: Quantronix Corporation, Smithtown, N.Y.

[21] Appl. No.: 701,508

[22] Filed: Feb. 14, 1985

[51] Int. Cl.⁴ .............................................. G01J 1/20
[52] U.S. Cl. ................................... 250/201; 250/204
[58] Field of Search ................ 250/201, 204; 354/403; 350/507, 521

[56] References Cited

U.S. PATENT DOCUMENTS 3,721,827 3/1973 Reinheimer ........................ 250/201
4,025,785 5/1977 Mueller ............................... 354/403
4,429,968 2/1984 Taka et al. ......................... 354/403
4,447,717 5/1984 Nohda ................................. 250/201
4,564,296 1/1986 Oshida et al. ..................... 250/201

Primary Examiner—David C. Nelms
Attorney, Agent, or Firm—Kane, Dalsimer, Kane, Sullivan and Kurucz

[57] ABSTRACT

An autofocusing microscope includes a spot marker assembly for projecting a spot marker on the sample surface. The image of the spot marker is continuously scanned while the objective lens is moved along a preselected range of distances from said sample surface. The lens is then moved to the optimum focusing in accordance with the scanning.

12 Claims, 3 Drawing Figures

METHOD AND APPARATUS FOR AUTOFOCUSING A MICROSCOPE

BACKGROUND OF THE INVENTION

1. Field of Invention

This invention pertains to microscopes and more particularly a method and apparatus for focusing a microscope automatically by projecting a preselected image on the sample surface.

2. Description of the Prior Art

Numerous schemes and devices have been proposed in the past for focusing microscopes automatically. Generally these schemes may be grouped into two major categories. One category makes use of the so-called photoelectric method while the second uses an image detection method. The photoelectric method comprises focusing the image of a light source (such as for example a He-Ne laser) on the sample surface and collecting the reflected light from the surface with a photodetector. The photodetector is located in the image plane of the sample and autofocusing is achieved by maximizing the light reaching the photodetector. A major deficiency of this method is that it requires a highly reflective and relatively flat sample surface to provide sufficient signal for the detector. In the second method, the actual image of the sample surface is scanned by a TV camera or photodetecting diode array to determine the image contrast. Autofocusing is achieved at the point of maximum contrast. A major deficiency of the second method is that the sample surface must have some inherent contrast. For example, it is difficult to use this method on sample surfaces which lack significant surface texture such as flat glass or a metal plate.

OBJECTIVES AND SUMMARY OF THE INVENTION

In view of the above described deficiencies of the prior art, a principal objective of the present invention is to provide a method and device for effectively focusing a microscope in a sample surface having a low contrast.

Another objective is to provide a method and device for focusing a microscope without the need for a laser light source.

A further objective is to provide a method and device for focusing a microscope on a sample surface having low reflectivity.

Other objectives and advantages of the invention shall become apparent from the following description of the invention. According to this invention, a microscope is focused automatically by projecting a spot marker into the sample surface through the microscope objective lens. The spot marker has a preselected geometric shape with sharp boundaries. The image of the spot marker is scanned to generate a signal indicative of the intensity of said image. The focusing of the microscope is shifted by moving the microscope objective lens through a preselected range in discrete steps and memory means are provided for storing the scanner signal corresponding to said steps, and then the object lens is moved to the position corresponding to the optimum scanner signal.

The microscope comprises means for generating a spot marker positioned and arranged to project said spot marker through an objective lens of a microscope, means for scanning the image of the spot marker reflected by the sample surface through the objective lens of a microscope, means for scanning the image of the spot marker reflected by the sample surface through the objective lens to generate a scanner image, means for shifting said objective lens towards and away from said sample surface and means for storing said scanner signals corresponding to the distance to said lens from said sample surface and for controlling the position of said lens.

By using a spot marker with sharp boundaries for autofocusing the scanned image has the required contrast so that the reflectivity and texture of the sample surface is immaterial.

In addition the focusing is achieved by using a relatively simple procedure. The actual focusing time is relatively short as compared to similar prior art devices. If necessary, the microscope may be defocused by a controllable increment.

DETAILED DESCRIPTION OF THE PREFERRED EMBODIMENT

Figure 1:
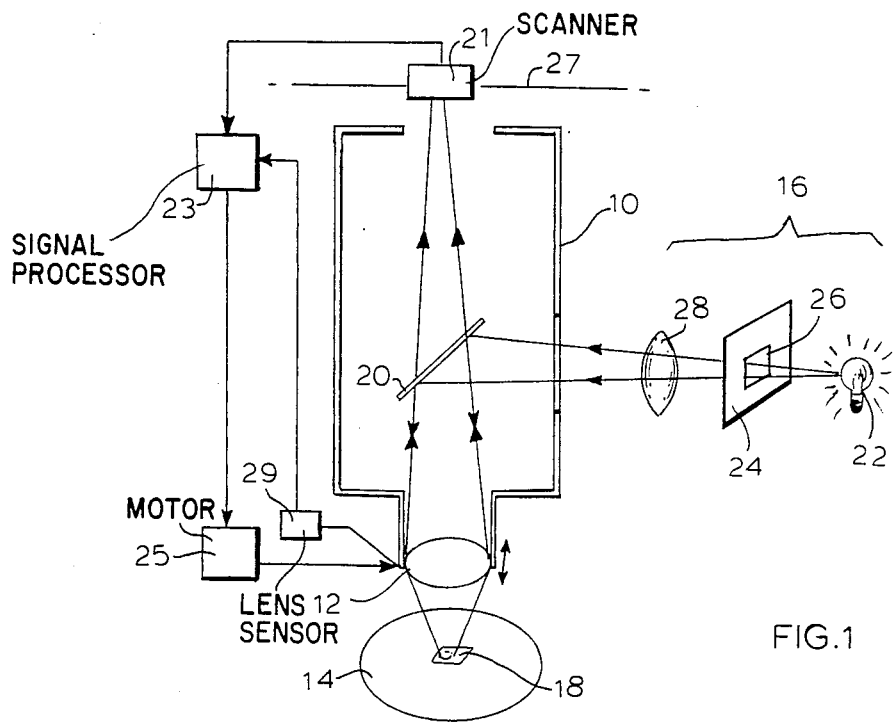
FIG. 1 illustrates the elements of a device constructed in accordance with this invention.

Typically a microscope comprises a body 10 having an objective lens 12 directed towards a sample surface 14. The microscope is focused by moving objective lens 12 towards or away from the sample surface. According to the present invention, a spot marker generating means 16 is positioned adjacent to the microscope as shown for projecting a spot marker 18 through objective lens 12 unto sample surface 14. Advantageously a dichroic mirror 20 is placed within the microscope for coupling the image from the spot marker generating means to the optical axis of the microscope.

Spot marker generating means 16 preferably comprises an illuminator 22 such as a low power tungsten light source, and a member 24. Member 24 is provided with an aperture 26 and is positioned and arranged so that light from illuminator passes through aperture 26 and is reflected by dichroic mirror 20 toward the lens as shown. A spot marker lens 28 may be shifted axially between member 26 and mirror 20 to focus the image of aperture 26 as the spot marker 18 on surface 14. While aperture 26 in FIG. 1 is rectangular, it is obvious to one skilled in the art that any other geometric shape is equally suitable as long as it has sharp, clearly defined boundaries or edges.

The image of the spot marker is transmitted through objective lens 12 and dichroic mirror 20 which is a flat partial reflector to a scanner 21 as shown. The scanner lies in the image plane 27 of the objective lens 12. The scanner generates an analog signal indicative of the light intensity on the image of the spot marker 18 in plane 27. For example scanner 21 may comprise a scanning silicon optical diode array, or a TV camera such as a Vidicon camera adapted to convert optical images into video signals.

The scanner signals are sent to a signal processor 23. Motor 25 and lens sensor 29 are also connected to the signal processor 23. Motor 25 is used to move lens 12 along the optical axis of the microscope toward or away from surface 14 as determined by the processor. Lens sensor 29 is adapted to sense the position of the lens 12 and to send said position to the signal processor 23.

Figure 2:
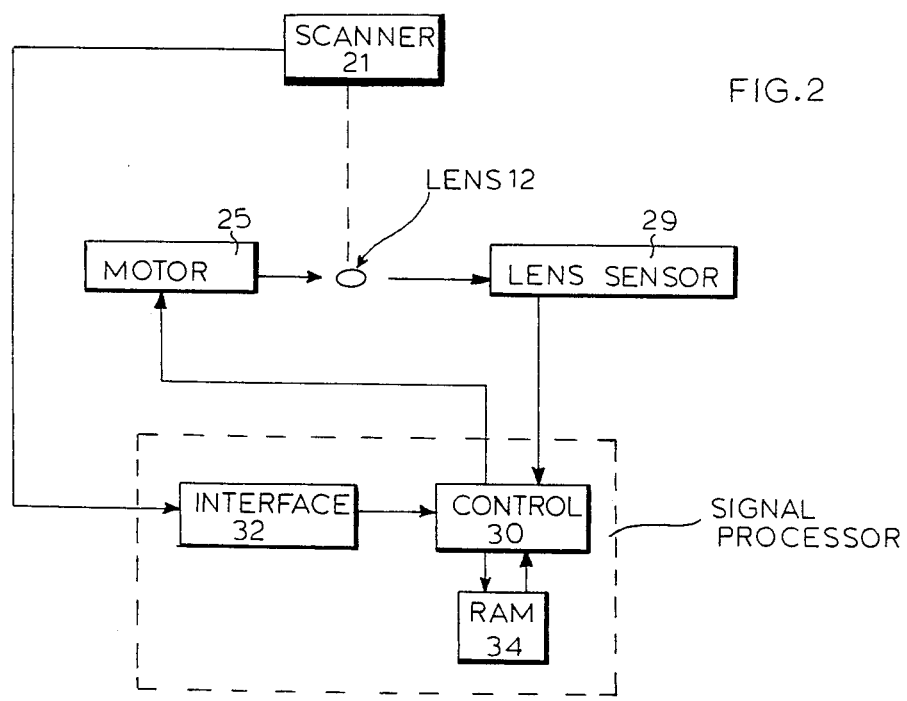
FIG. 2 shows a schematic diagram for the device of FIG. 1.

Details of the signal processor 23 are shown in FIG. 2 together with interconnections to the other elements of the invention. The signal processor 23 comprises a controller 30, an interface element 32 and a random access memory (RAM) 34. The controller is adapted to move the lens 12 axially through a preselected range and to select the optimal position of the lens by determining the position at which the scanner signal from scanner 21 and/or its contrast is at a maximum. This position corresponding to the optimum focusing of the microscope.

The interface element 32 is provided to convert and buffer the signals received from scanner 21 into signals acceptable for controller 30. Associated with controller 30 is a random access memory (RAM) 34. The purpose of memory 34 is to store various positions of lens 12 and the spot marker image corresponding to each position of the lens 12 as determined by scanner 21.

Figure 3:
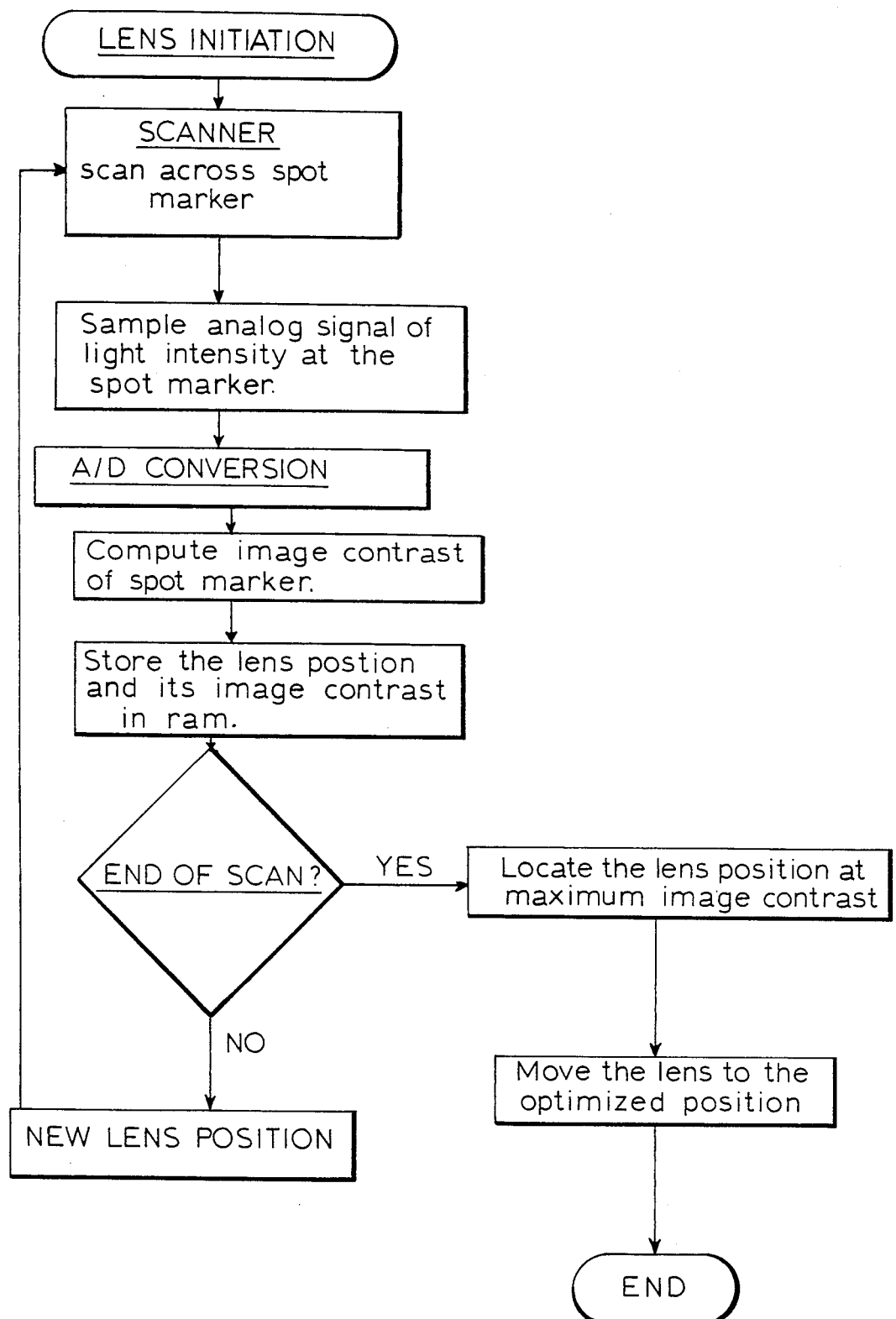
FIG. 3 shows a schematic diagram for the algorithm of the signal processor in this invention.

The operation of the subject device is illustrated in FIG. 3. After initiation, lens 12 is moved in discrete steps through a predetermined range along the optical axis of the microscope. For example the lens may be moved from the closest position of the lens 12 to sample surface 14 to the farthest, or vice versa. This motion is accomplished by the actuation of motor 25 by controller 30. Since relatively minute distances are involved, the position of the lens is sent to controller 30 by lens sensor 29. At preset intermediary positions of the lens 12 the scanner 21 receives scanner signals indicative of the light intensity of the spot marker. These signals are converted by interface 32 and provided in appropriate form to controller 30. Controller 30 then computes the contrast of the signals from their respective intensity difference and then stores the contrast signals and the corresponding lens positions in RAM 34. After the whole range of positions has been covered, controller 30 reviews all the scanned signal stored into RAM 34 and selects the stored signal corresponding to the maximum spot marker image contrast. The controller also obtains the respective lens positions form the RAM 34 and commands motor 25 to move lens 12 to the selected position.

The microscope is now set for optimum focusing. If desired, the microscope may also be set to a position in which the microscope is defocused by a preselected amount. For this purpose controller 30 is adapted to select the position corresponding to a scanner signal which differs from the maximum scanner signal by a preselected value or ratio.

The components illustrated in FIGS. 1 and 2 are well known. For example controller 30 could comprise a microprocessor such as a Motorola 6809 equipped with a RAM such as MCM4116. In this case interface 32 could include an appropriate A/D converter for proper conversion of the analog signals from scanner 21.

Obviously numerous modifications may be made to the invention without changing its principle that an autofocusing is accomplished through an optimized contrast of a self-provided spot marker image on the sample plane.

I claim:

1. An autofocusing microscope on a sample surface, said microscope having an objective lens comprising:

means for generating a preselected image on a sample surface, the objective lens imaging the preselected image onto the surface;

means for scanning said preselected image at a plurality of objective lens positions;

means for selectively moving said objective lens along an optical axis of the microscope, the optical axis defined by a line passing through a central point in the sample surface and a central point in the objective lens in a preselected range of positions; and means for determining an optimal position of said lens in accordance with the scanned preselected image.

2. An autofocusing microscope comprising:

an objective lens movable along an optical axis of the microscope, the objective lens imaging the preselected image onto the surface;

means for projecting a spot marker along said optical axis to form an image on a sample surface;

means for scanning the image along said optical axis at a plurality of objective lens positions and generating scanning signals indicative of the focus of said image; and control means connected to the scanning means for moving said objective lens to an optimum position in accordance with said scanning means.

3. The microscope of claim 2 wherein said control means comprises a signal processor and a motor for moving said lens along said optical axis.

4. The microscope of claim 3 wherein said signal processor is adapted to move said lens through a preselected range to determine the position which corresponds to a maximum rate of change of values of the scanning signal.

5. The microscope of claim 4 wherein said signal processor is adapted to store the scanning signals corresponding to each lens position within said range and to move said lens to the position corresponding to said maximum scanning signal.

6. The microscope of claim 2 wherein said objective lens is located and aligned for projecting the spot marker onto said sample surface.

7. The microscope of claim 6 wherein said objective lens is located and aligned for scanning said image.

8. The microscope of claim 2 wherein said means for scanning comprises a video camera.

9. The microscope of claim 8 wherein said means for scanning comprises an array of photodiodes.

10. The microscope of claim 2 wherein said means for generating a preselected image comprises a light source and a mask having an aperture corresponding to said spot marker.

11. A method of focusing microscope on a sample surface with an objective lens comprising:

generating a spot marker;

projecting said spot marker through said objective lens unto the sample surface to form an image;

moving said objective lens along a preselected range;

scanning said image along a plurality of lens positions to generate scanning signals;

storing the scanning signals corresponding to positions of said lens within said range; and moving said lens to the position corresponding to the maximum scanning signal.

12. The method of claim 11 comprising the step of providing an indication of the contrast of said image by said scanning signals.

* * * * *